US011158030B2

(12) United States Patent
Manhart

(10) Patent No.: US 11,158,030 B2
(45) Date of Patent: Oct. 26, 2021

(54) NOISE REDUCTION IN COMPUTED TOMOGRAPHY DATA

(71) Applicant: Siemens Healthcare GmbH, Erlangen (DE)

(72) Inventor: Michael Manhart, Fürth (DE)

(73) Assignee: Siemens Healthcare GmbH, Erlangen (DE)

( * ) Notice: Subject to any disclaimer, the term of this patent is extended or adjusted under 35 U.S.C. 154(b) by 2 days.

(21) Appl. No.: 16/808,354

(22) Filed: Mar. 3, 2020

(65) Prior Publication Data

US 2020/0286211 A1    Sep. 10, 2020

(30) Foreign Application Priority Data

Mar. 4, 2019 (DE) .................. 102019202878.0

(51) Int. Cl.
 G06T 5/00 (2006.01)
 G06T 5/20 (2006.01)
(52) U.S. Cl.
 CPC ............ G06T 5/002 (2013.01); G06T 5/20 (2013.01); *G06T 2207/10081* (2013.01)
(58) Field of Classification Search
 None
 See application file for complete search history.

(56) References Cited

U.S. PATENT DOCUMENTS 9,147,267 B2 * 9/2015 Bruder .................. G06T 11/006
9,498,177 B2 * 11/2016 Bruder .................. G06T 11/006
9,569,864 B2 * 2/2017 Abdurahman ....... A61B 6/5223
10,204,425 B2 * 2/2019 Zeng ...................... G06T 11/003
2007/0196008 A1 * 8/2007 Borsdorf ............... G06T 11/005
382/131

(Continued)

OTHER PUBLICATIONS

Khodabandeh, Aryan. "Computed Tomography Noise Reduction Based on Total Variation Minimization and Morphological Component Analysis." (2015). (Year: 2015).*

(Continued)

*Primary Examiner* — Andrae S Allison
(74) *Attorney, Agent, or Firm* — Lempia Summerfield Katz LLC

(57) ABSTRACT

A method for noise reduction in a three-dimensional computed tomography dataset, which is reconstructed from two-dimensional projection images recorded with an x-ray device using different recording geometries, is provided. In a post-processing section following the reconstruction of the computed tomography dataset, to obtain a first intermediate dataset, a first, edge-preserving filter is applied to the reconstructed computed tomography dataset. To obtain a second intermediate dataset, a second, morphological filter is applied to the reconstructed computed tomography dataset. A first weighting dataset weighting edges more strongly is established from a subtraction dataset of the first intermediate dataset and the second intermediate dataset. A noise-reduced result dataset is established as a weighted sum of the first intermediate dataset and the second intermediate dataset. The first intermediate dataset is weighted with the first weighting dataset, and the second intermediate dataset is weighted with one minus the first weighting dataset.

17 Claims, 3 Drawing Sheets

(56) References Cited

U.S. PATENT DOCUMENTS

| | | | | |
|---|---|---|---|---|
| 2008/0260092 | A1* | 10/2008 | Imai | A61B 6/4035 |
| | | | | 378/5 |
| 2009/0297044 | A1* | 12/2009 | Kokumai | H04N 5/91 |
| | | | | 382/219 |
| 2010/0172464 | A1* | 7/2010 | Pavlovich | A61B 6/4028 |
| | | | | 378/9 |
| 2016/0324499 | A1* | 11/2016 | Sen Sharma | A61B 6/032 |
| 2017/0011111 | A1* | 1/2017 | Pallath | G06F 16/285 |
| 2018/0276802 | A1* | 9/2018 | Lichy | A61B 6/032 |
| 2019/0331750 | A1* | 10/2019 | Zhu | G01R 33/56341 |
| 2020/0104990 | A1* | 4/2020 | Kimura | G06K 9/6215 |

OTHER PUBLICATIONS

J.-L. Starck, Y. Moudden, J. Bobin, M. Elad, D. L. Donoho, "Morphological component analysis," Proc. SPIE 5914, Wavelets XI, 59140Q (Sep. 17, 2005); doi: 10.1117/12.615237 (Year: 2005).*

Yu, Wei, and Li Zeng. "A novel weighted total difference based image reconstruction algorithm for few-view computed tomography." PLoS One 9.10 (2014): e109345. (Year: 2014).*

Mia et al, An algorithm for noise correction of dual-energy computed tomography material density images, Int J CARS (2015) 10:87-100; DOI 10.1007/s11548-014-1006-z (Year: 2015).*

He, Kaiming, Jian Sun, and Xiaoou Tang. "Guided image filtering." IEEE transactions on pattern analysis and machine intelligence 35.6 (Jun. 2013): 1397-1409.

Treece, Graham. "The bitonic filter: linear filtering in an edge-preserving morphological framework." IEEE Transactions on Image Processing 25.11 (2016): 5199-5211.

* cited by examiner

NOISE REDUCTION IN COMPUTED TOMOGRAPHY DATA

This application claims the benefit of German Patent Application No. DE 10 2019 202 878.0, filed Mar. 4, 2019, which is incorporated by reference in its entirety.

BACKGROUND

The present embodiments relate to noise reduction in a three-dimensional computed tomography dataset.

Computed tomography has now become established, especially as a medical imaging modality. As well as the use of classical computed tomography devices, in which at least parts of the recording arrangement consisting of x-ray emitter and x-ray detector are moved within a gantry, it has been proposed ever more frequently that x-ray devices having flexibly-positionable recording arrangements are also employed in order to record two-dimensional projection images of a patient from different directions (e.g., with different recording geometries) and to reconstruct three-dimensional computed tomography datasets therefrom (e.g., using Filtered Back Projection (FBP)). Such imaging variants are known as "DynaCT".

In the most frequent cases, a C-arm x-ray device (e.g., an x-ray device with a C-arm), on which an x-ray emitter and an x-ray detector are arranged opposite one another, is used for this. In this context, this may also be referred to as C-arm computed tomography (C-arm CT).

Although a high spatial resolution may be achieved by using C-arm x-ray devices, the image quality in soft tissue is limited, however. One of the reasons for this limited image quality is a high level of noise in the slice images, which arises as a result of quantum and electron noise at the detector. A good soft tissue contrast is important for many application cases (e.g., neuroradiological application cases such as the exclusion of bleeding after a neuroradiological procedure and in diagnosis of strokes). With respect to a stroke, for example, a differentiation between gray and white tissue in the brain is of importance for determining the size of the infarction.

It has therefore been proposed, for example, for C-arm CT that noise reduction methods that obtain the high spatial resolution but, in soft tissue, still create an image that is as low-noise and high-contrast as possible be used. In such cases, to reduce the noise, a smoothing reconstruction kernel may be employed in combination with a greater thickness of the slice images, and thus, with a greater voxel extent. However, in this way, the spatial resolution is reduced, and blurred bone structures occur. The soft tissue contrast also does not appear optimal by contrast with non-smoothed construction.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a possibility for noise reduction in computed tomography datasets that obtains high-contrast details and enhances the soft tissue contrast is provided.

In accordance with one or more of the present embodiments, in a post-processing section following the reconstruction of the computed tomography dataset, a first edge-preserving filter is applied to the reconstructed computed tomography dataset to obtain a first intermediate dataset. A morphological filter is applied to the reconstructed computed tomography dataset to obtain a second intermediate dataset. A first weighting dataset weighting edges more strongly is established from a first subtraction dataset of the first intermediate dataset and the second intermediate dataset. A noise-reduced result dataset is established as the weighted sum of the first intermediate dataset and the second intermediate dataset. The first intermediate dataset is weighted with the first weighting dataset, and the second intermediate dataset is weighted with one minus the first weighting dataset. The noise-reduced computed tomography dataset is established as the result dataset or from the result dataset.

In one or more of the present embodiments, through a combination of different non-linear filters, a reduction in noise that is as good as possible may be achieved, while retaining the contrast in the bones and in the soft tissue. It is not sufficient just to apply a filter to the reconstructed computed tomography dataset, since these types of noise-reducing filter are usually developed for photographs. By contrast with photographs, there are far greater dynamic ranges present in computed tomography datasets that are the result of very high contrast on bones with, at the same time, low contrasts and high noise in soft tissue. Therefore, the direct application of non-linear filters, which were originally developed for noise reduction in photographs, does not give the best possible results. For example, the application of edge-preserving non-linear filters to a reconstructed computed tomography dataset, although leading to a greater spatial resolution, also provides that the image quality may deteriorate (e.g., since image artifacts (usually not occurring in photographs) may be additionally amplified and the like). With the pure application of a morphological non-linear filter, although a marked reduction in the noise level may be determined, high-contrast details get lost, however, and the soft tissue contrast is not optimal, since finer, diagnostically relevant differences may be misinterpreted as noise.

The combination of an edge-preserving, first, non-linear filter in areas of high-contrast edges, a morphological, second, non-linear filter in other areas, and a suitable weighting in a transition area in relation to the strength of the edges leads to a markedly improved result, in which both the strong edges (e.g., through to bone tissue) are obtained in full spatial resolution and noise effects in the area of soft tissue are removed without the relevant structures getting lost.

A guided filter or a bilateral filter may be used as the edge-preserving filter, and/or a bitonic filter may be used as the morphological filter. For example, a combination of a guided filter and a bitonic filter may be provided. Other morphological filters may include mean value filters and the like, for example.

The guided filter is described and defined, for example, in an article by Kaiming He et al., "Guided Image Filtering," IEEE Transactions on Pattern Analysis and Machine Intelligence 35 (2013), pages 1397-1409. The bitonic filter is described, for example, in an article by Graham Treece, "The Bitonic Filter: Linear Filtering in an Edge-Preserving Morphological Framework," IEEE Transaction on Image Processing 25 (2016), pages 5199-5211. As experiments have shown, the application of the guided filter on its own in computed tomography datasets, depending on parameterization, leads to a limited edge preservation or to a good edge preservation, where in the latter case, however, a "grainy" impression arises in the soft tissue, in which individual edges caused by streak artifacts appear. The application of the bitonic filter on its own creates low-noise images with good soft tissue contrast, where the preservation of bone edges is highly inadequate, however. Thus, an exemplary embodiment of the provides a combination of the guided filter, parameterized for good edge preservation, with the bitonic filter. This also, for example, opens up the possibility of an implementation in a computationally efficient post-processing step.

This is, for example, because this C-arm computed tomography is of great importance when C-arm x-ray devices are used with high soft tissue contrast and high spatial resolution in neuroradiological interventions and/or examinations (e.g., in the investigation of strokes and/or when carrying out stenting). In such cases, fast processing times and ease of use are essential. The combination of non-linear filters, which is optimized for computed tomography imaging, makes it possible in an efficient computational post-processing step to greatly reduce noise with good spatial resolution and optimized soft tissue contrast. In this case, a particular advantage for the user is also produced by the noise reduction being able to be carried out in a simple post-processing step (e.g., by the simple press of a button).

This contrasts with the previous secondary reconstruction carried out with a soft filter kernel and the retroactive adaptation of the voxel size (e.g., "slice thickness"). Approaches that employ iterative reconstruction methods may also, with suitable regularization, create reduced-noise images with high spatial resolution, but involve much more computation and may not be applied in a simple post-processing step.

The combination of non-linear filters of one or more of the present embodiments, based on computed tomography, which is also referred to as "morphological filter with edge preservation" (e.g., "bitonic filter with edge preservation"), leads to a marked reduction of the noise level, a preservation of high-contrast details, and outstanding soft tissue contrast.

Particular advantages of the bitonic filter by comparison with bilateral filters are described below. The bitonic filter represents a combination of morphological operators and a Gauss filter. In this case, morphological opening and closing operations, for example, are applied to the initial image, where the output is a weighted sum of the opening and closing, and weights are formed by Gauss-smoothed differential images between opening and original and closing and original. The bitonic filter may be implemented quickly and easily and only has one significant parameter (e.g., the scope of the morphological subfilter).

In one embodiment, there may be provision for the filter to be applied two-dimensionally to consecutive slice images in one image direction of the reconstructed computed tomography dataset. The three-dimensional, reconstructed computed tomography dataset may be characterized by voxels defined with regard to a three-dimensional coordinate system, so that the three-dimensional, reconstructed computed tomography dataset may also be understood as a stack of slice images or sectional images. When the projection images are recorded along a circular path, there may be provision, for example, for the x and the y direction to lie in the plane of the circle and for the z direction, then also referred to as the axial direction, to lie at right angles hereto. For example, there may thus be provision for filtering of x, y slice images by the two-dimensionally embodied first and second filters, thus for considering the individual slice images independently.

The general advantage of a two-dimensional filtering is its ability to be carried out quickly and easily, where it has been shown that outstanding results may already be obtained in this way.

In one embodiment, there is provision in this context for a one-dimensional filtering in the image direction to be applied to the result dataset of the two-dimensional filtering (e.g., the x-z slice images thus in the z direction (axial direction)). Through the filtering in the image direction, a further visible reduction of the noise in the soft tissue is achieved. In combination with the edge reconstruction, however, bone structures are also preserved in this regard. Since the result dataset is already greatly noise-reduced, the use of the edge-preserving filter may be dispensed with for the filtering in the axial direction, so that for one-dimensional filtering, a one-dimensional filter (e.g., corresponding to the second, morphological filter; a bitonic filter) is applied to the result dataset for obtaining a third intermediate dataset, a second weighting dataset weighting edges more strongly is established from the subtraction dataset of the third intermediate dataset and the result dataset, and the noise-reduced computed tomography dataset is established as the weighted sum of the result dataset and the third intermediate dataset. The result dataset is weighted with the second weighting dataset, and the third intermediate dataset is weighted with one minus the second weighting dataset. In this case, more strongly weighting provides that edges are weighted more strongly by comparison with other image contents.

As regards the establishment of the first weighting dataset and/or the second weighting dataset, there may be provision for a respective maximum and minimum subtraction value to be defined. With a subtraction data item of the subtraction dataset not exceeding the minimum subtraction value, the corresponding weight of the weighting dataset is set to zero. With a subtraction data item of the subtraction dataset exceeding the minimum subtraction value, the corresponding weight of the weighting dataset is set to one. Otherwise, a weight between zero and one is selected for a constant transition (e.g., as the quotient of the amount of the distance between the subtraction data item and the minimum subtraction value and the amount of the distance between the maximum and the minimum subtraction value). In this case, the maximum and the minimum subtraction value may be derived from the known imaging characteristics of different tissue types, but also in addition and/or as an alternative, may be determined heuristically (e.g., by evaluation of existing image impressions by users). The minimum and the maximum subtraction value thus represent threshold values, which define a transition area that distinguishes between strong contrast differences resulting from different edge information and smaller differences in the low-contrast area. It is provided in this way that the high-contrast structures (e.g., bones) continue to be preserved in outstanding spatial resolution, weaker edges in the soft tissue also remain sufficiently present, and actual pure noise structures may disappear. The minimum and maximum subtraction values may be selected differently for the first and the second weighting dataset.

The present embodiments may be employed to particular advantage in the area of neuroradiology. Thus, there may be provision for the computed tomography dataset to show the head of a patient.

As well as relating to the method, the invention also relates to an x-ray device (e.g., a C-arm x-ray device) that has a control device embodied for carrying out the method of one or more of the present embodiments. In this way, a noise reduction may be employed directly at the x-ray device itself (e.g., after selection by a user) in a processing step able to be implemented easily and computationally-efficiently. This may be provided, for example, for assessing the computed tomography dataset directly at the x-ray device and/or when using the x-ray device as an accompaniment to a medical intervention (e.g., a neurological intervention on the brain). The C-arm x-ray device may thus have a C-arm, on which an x-ray emitter and an x-ray detector are arranged opposite one another. As a result of degrees of freedom of movement of the C-arm, the arrangement formed by the x-ray emitter and the x-ray detector may be positioned for specific recording geometries. In one embodiment, the control device, which may have at least one processor and at least one storage device, may also already be embodied for reconstruction of the computed tomography dataset from the two-dimensional projection images.

For example, a control device may thus have a reconstruction unit for establishing the reconstructed computed tomography dataset, a first filter unit and a second filter unit for use of the first filter or the second filter, a weighting determination unit for establishing the first weighting dataset, and a weighting unit for establishing the noise-reduced result dataset. Further functional units in accordance with embodiments may be provided. For example, a third filter unit for using the one-dimensional filter may be provided. The weighting determination unit and the weighting unit may also be embodied to undertake the corresponding weightings in relation to the third intermediate dataset and the result dataset. One or more (e.g., all) of the functional units may be formed by one or more processors.

A computer program of one or more of the present embodiments is able to be loaded directly into a memory of a computing device (e.g., with a control device of an x-ray device) and includes instructions for carrying out the acts of a method when the computer program is executed in the computing device. The computer program may be stored on an electronically-readable data medium (e.g., a non-transitory computer-readable storage medium) that includes electronically-readable control information stored thereon. The electronically-readable control information includes at least one computer program and is configured so as to carry out a method when the data medium is used in a computing device (e.g., a control device of an x-ray device). The data medium may, for example, involve a non-transient data medium (e.g., a CD-ROM).

DETAILED DESCRIPTION

Figure 1:
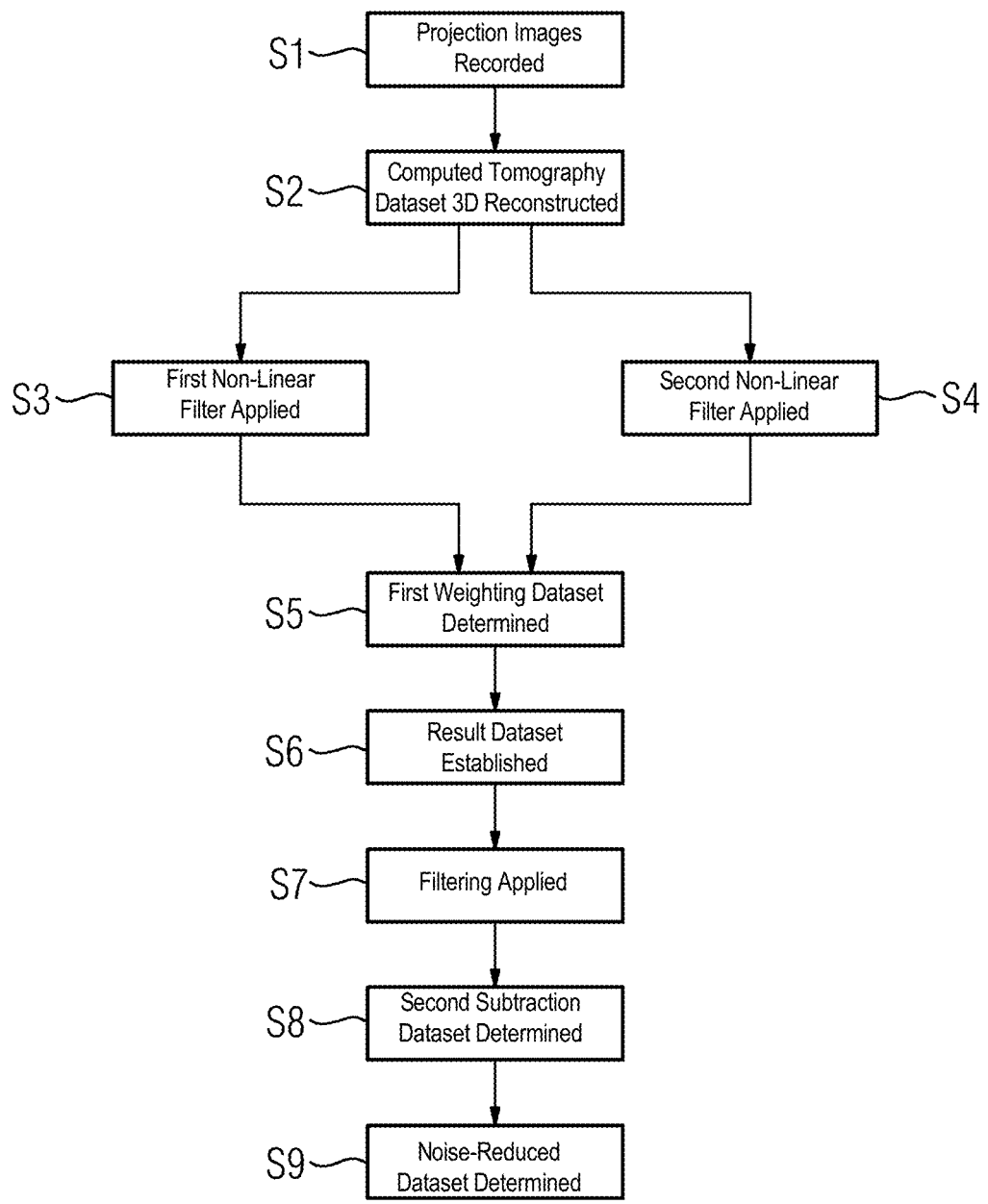
FIG. 1 shows a flowchart of an exemplary embodiment of a method.

FIG. 1 shows a flowchart for explaining an exemplary embodiment of a method. In this diagram, in act S1, projection images of a head of a patient are recorded with a C-arm x-ray device using different recording geometries. In act S2, within the control device of the x-ray device, the reconstruction of a three-dimensional, reconstructed computed tomography dataset takes place (e.g., by filtered back projection). The noise in this is to be reduced while retaining all information of importance for diagnosis.

For this, in act S3, a first non-linear edge-preserving filter (e.g., a guided filter G) is applied two-dimensionally to corresponding slice images of the reconstructed computed tomography dataset, which follow on from one another in one image direction of the reconstructed computed tomography dataset S. In act S4, there is a corresponding application of a second, non-linear, morphological filter (e.g., of a bitonic filter B), likewise two-dimensionally to the corresponding slice images of the reconstructed computed tomography dataset S, so that, as a result of the acts S3 and S4, a first intermediate dataset Z1 and a second intermediate dataset Z2 are produced.

Thus, expressed in symbolic formulae, Z1=G (S) and Z2=B (S).

In act S5, a subtraction dataset D is then established by subtraction of the first intermediate dataset from the second intermediate dataset, D=Z1−Z2, from which a first weighting dataset W (e.g., stack of weighting images) is then determined. This occurs in the present exemplary embodiment as a result of the following relationships, where $d_{min}$ and $d_{max}$ are a minimum and a maximum subtraction value, which represent threshold values for a transition area.

$W(x,y,z)=0$ for all $|D(x,y,z)|<d_{min}$ $W(x,y,z)=(|D(x,y,z)|-d_{min})/(d_{max}-d_{min})$ for all $d_{min}<=|D(x,y,z)|<=d_{max}$ $W(x,y,z)=1$ for all $|D(x,y,z)|>d_{max}$ Thus, in this way, whenever a strong edge preserved by the edge-preserving filter, which is blurred in the second intermediate dataset, is encountered, a weighting of 1 is applied; in the reverse case, a weighting of zero is applied, and in the intermediate area, a constant transition is achieved.

Using the weighting dataset G established in this way in act S5, a noise-reduced result dataset may be established from a combination of Z1 and Z2, as, for example:

$E=(1-W)\times Z2+W\times Z1$

This provides that, where the blurring of edges is determined in the subtraction dataset, the result of the edge-preserving first filter will be employed, and thus, the edge will be preserved highly-resolved, since the first intermediate dataset is weighted with the weighting dataset. The second intermediate dataset, which is weighted with one minus the weighting dataset will thus be largely or entirely employed when such a loss of edge or an edge blurring has been determined. This makes possible a result, in which the edge preservation of the guided filter is combined with the good image quality in soft tissue of the bitonic filter.

In the following acts, the noise is also reduced by a filtering in the image direction (e.g., via the axial direction (z direction) after the image slices were defined in the x-y plane). To do this, in act S7, there is first the filtering of the result dataset E in the image direction with a one-dimensional bitonic filter B1 in order to obtain a third intermediate dataset Z3=B1(E). Since the noise in the result dataset E is already greatly reduced, employing a guided filter for the filtering in the image direction may be dispensed with. This provides that, in act S8, a second subtraction dataset DZ=Z3−E is immediately established, and similarly to act S5, a weighting dataset WZ with corresponding adapted, different minimum and maximum subtraction values is computed.

In act S9, the noise-reduced computed tomography dataset EZ is established by combination of E and Z3, once again as $$EZ=(1-WZ) \times Z3+WZ \times E.$$

Figure 2:
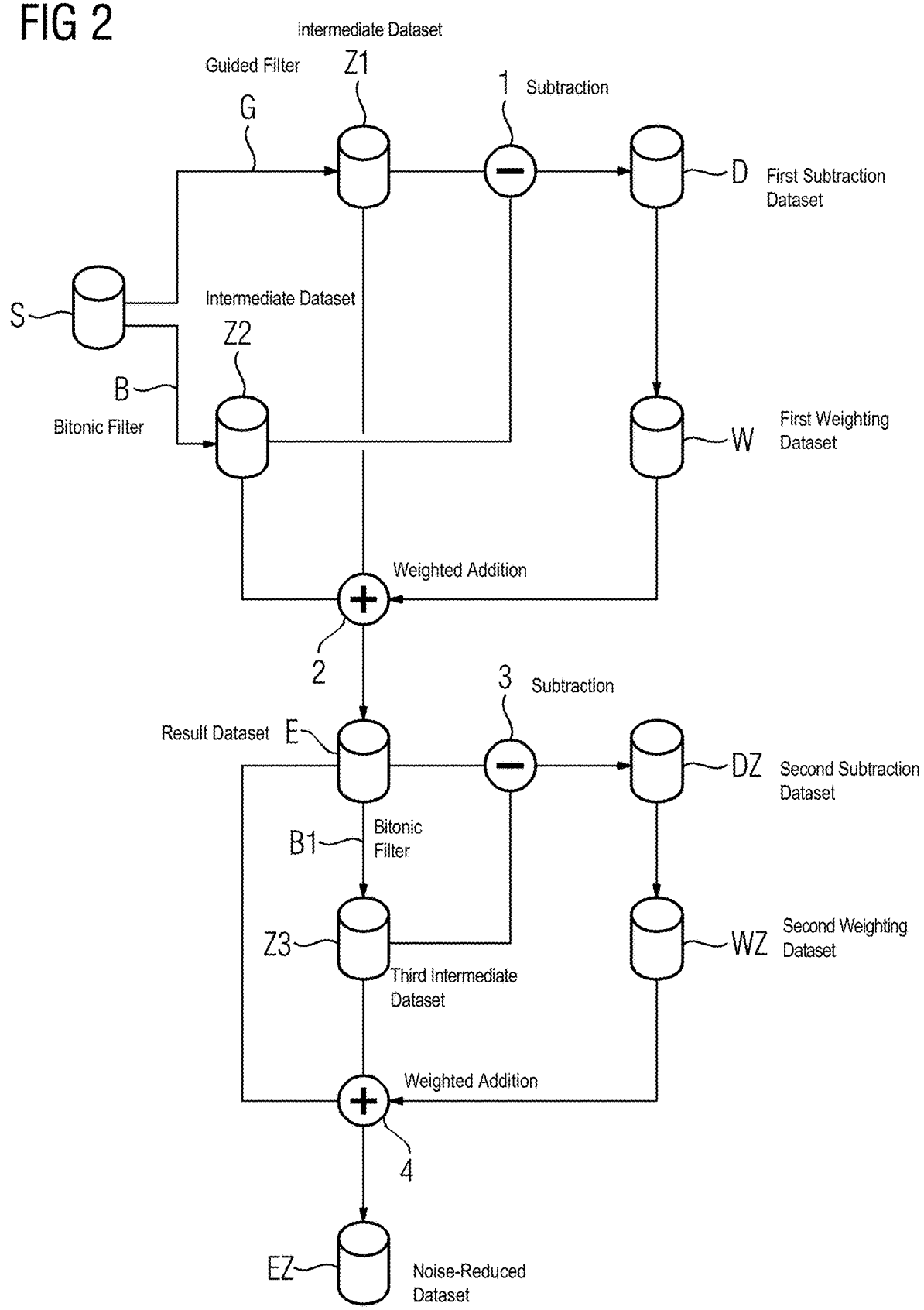
FIG. 2 shows an influence diagram for further explanation of the method in accordance with FIG. 1.

FIG. 2 shows these relationships once again more precisely. The starting point, as described, is the reconstructed computed tomography dataset F expressed as a stack of image slices, which follow on from each other in the image direction. For these, through the two-dimensional filtering with the guided filter G and the bitonic filter B, the intermediate datasets Z1 and Z2 stem. By subtraction 1, the first subtraction dataset D is produced from this. This is used, as described for act S5, in order to determine the first weighting dataset G.

The result dataset E is produced by weighted addition 2 of the intermediate datasets Z1 and Z2 using the weighting dataset G. The one-dimensional bitonic filter B1 is then applied to these in the image direction in order to obtain the third intermediate dataset Z3. Through a further subtraction 3, the second subtraction dataset DZ is established, which is used in a similar way to act S5 in order to obtain the second weighting dataset WZ.

This is employed to establish the weights in the addition 4 of the result dataset E and the third intermediate dataset Z3 in order to obtain the noise-reduced computed tomography dataset EZ.

Figure 3:
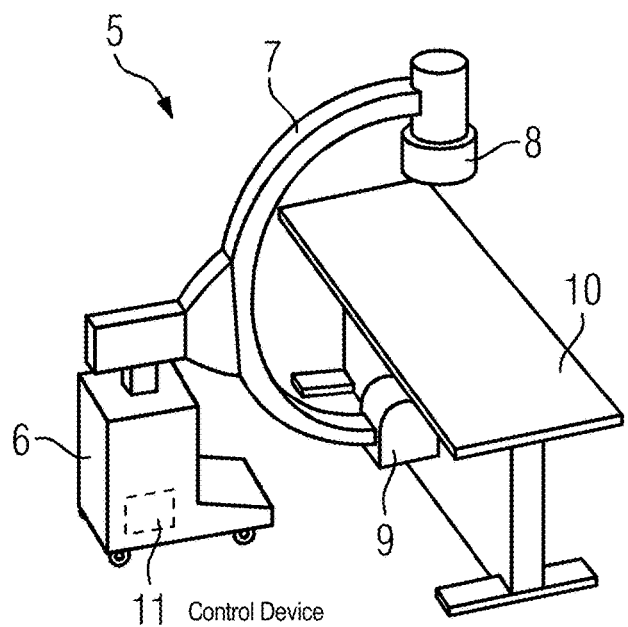
FIG. 3 shows one embodiment of an x-ray device.

FIG. 3 shows a basic diagram of one embodiment of an x-ray device 5 (e.g., a C-arm x-ray device) that thus includes a C-arm 7 supported on a stand 6, which may be mobile, on the ends of which an x-ray emitter 8 and an x-ray detector 9 are arranged opposite one another as a recording arrangement. As a result of the degrees of freedom of movement of the C-arm 7, the recording arrangement may be brought into different recording geometries as regards a patient supported on a patient table 10.

The operation of the x-ray device 5 is controlled by a control device 11, which is also embodied to carry out the method of one or more of the present embodiments.

Figure 4:
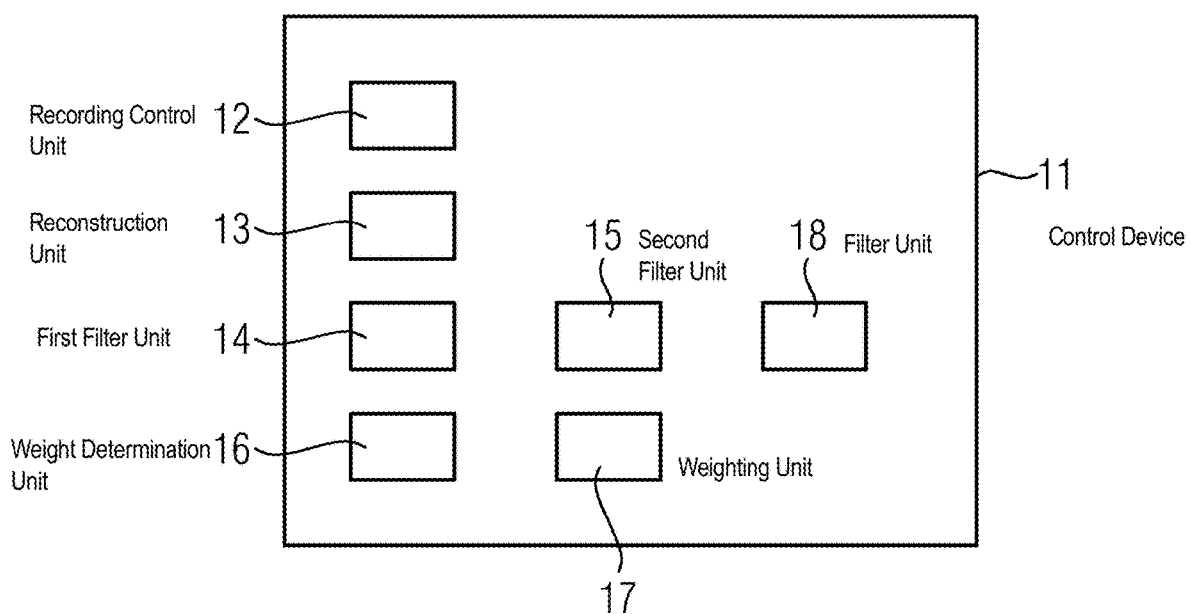
FIG. 4 shows an exemplary functional structure of a control device of the x-ray device in accordance with FIG. 3.

FIG. 4 shows the functional layout of the control device 11 more precisely. As well as a recording control unit 12 used for the general control for the recording of projection images and other x-ray images, the control device 11 also includes a reconstruction unit 13 for reconstruction of three-dimensional computed tomography datasets from projection images. In a first filter unit 14 and a second filter unit 15, the two-dimensional first and second filters are applied in accordance with acts S3 and S4. The results, the first and the second intermediate dataset, are then passed on to a weight determination unit 16 in order to determine the first weighting dataset in accordance with act S5. A weighting unit 17 establishes the result dataset in accordance with act S6. If a one-dimensional filtering is provided, a further filter unit 18 may also be provided for carrying out act S7; the acts S8 and S9 may be carried out in turn by the weight determination unit 16 and the weighting unit 17, so that at the end, the noise-reduced computed tomography dataset is obtained. If, incidentally, one-dimensional filtering is to be dispensed with, the noise-reduced computed tomography dataset is produced directly as the result dataset.

Although the invention has been illustrated and described in greater detail by the exemplary embodiments, the invention is not restricted by the disclosed examples; other variations may be derived herefrom by the person skilled in the art without departing from the scope of protection of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for noise reduction in a three-dimensional computed tomography dataset, which is reconstructed from two-dimensional projection images recorded with an x-ray device using different recording geometries, the method comprising:

in a post-processing section following the reconstruction of the three-dimensional computed tomography dataset:

applying a first, edge-preserving filter to the reconstructed three-dimensional computed tomography dataset, such that a first intermediate dataset is obtained;

applying a second, morphological filter to the reconstructed three-dimensional computed tomography dataset, such that a second intermediate dataset is obtained;

establishing a first weighting dataset weighting edges more strongly from a subtraction dataset of the first intermediate dataset and the second intermediate dataset; and establishing a noise-reduced result dataset as a weighted sum of the first intermediate dataset and the second intermediate dataset, wherein the first intermediate dataset is weighted with the first weighting dataset, and the second intermediate dataset is weighted with one minus the first weighting dataset, wherein a noise-reduced computed tomography dataset is established as the noise-reduced result dataset or from the noise-reduced result dataset.

2. The method of claim 1, wherein a guided filter or a bilateral filter is used as the first, edge-preserving filter, a bitonic filter is used as the second, morphological filter, or a combination thereof.

3. The method of claim 2, wherein the first, edge-preserving filter, the second, morphological filter, or each of the first, edge-preserving filter and the second, morphological filter is applied two-dimensionally to consecutive slice images of the reconstructed computed tomography dataset in one image direction.

4. The method of claim 3, wherein a one-dimensional filtering in the image direction is applied to the result dataset of the two-dimensional filtering.

5. The method of claim 4, wherein for the one-dimensional filtering, a one-dimensional filter is applied to the result dataset, such that a third intermediate dataset is obtained, wherein the method further comprises:

establishing a second weighting dataset weighting edges more strongly from a subtraction dataset of the third intermediate dataset and the result dataset; and establishing the noise-reduced computed tomography as a weighted sum of the result dataset and the third intermediate dataset, wherein the result dataset is weighted with the second weighting dataset and the third intermediate dataset with one minus the second weighting dataset.

6. The method of claim 5, wherein the one-dimensional filter corresponds to the second, morphological filter.

7. The method of claim 5, wherein establishing the first weighting dataset, establishing the second weighting dataset, or establishing the first weighting dataset and establishing the second weighting dataset comprises defining a maximum subtraction value and a minimum subtraction value in each case, and wherein for a subtraction data item of the subtraction dataset not exceeding the minimum subtraction value, a corresponding weight of the weight dataset is set to zero, for a subtraction data item of the subtraction dataset exceeding the maximum subtraction value, a corresponding weight of the weight dataset is set to one, and otherwise, a weight between zero and one for a constant transition is selected.

8. The method of claim 7, wherein when the weight between zero and one for a constant transition is selected, the weight is a quotient of an amount of a distance between the item of subtraction data and the minimum subtraction value and an amount of a distance between the maximum subtraction value and the minimum subtraction value.

9. The method of claim 1, wherein the x-ray device is a C-arm x-ray device.

10. The method of claim 1, wherein the three-dimensional computed tomography dataset shows the head of a patient.

11. An x-ray device comprising:
a controller configured for noise reduction in a three-dimensional computed tomography dataset, which is reconstructed from two-dimensional projection images recorded with an x-ray device using different recording geometries, the noise reduction comprising:
in a post-processing section following the reconstruction of the three-dimensional computed tomography dataset:
application of a first, edge-preserving filter to the reconstructed three-dimensional computed tomography dataset, such that a first intermediate dataset is obtained;
application of a second, morphological filter to the reconstructed three-dimensional computed tomography dataset, such that a second intermediate dataset is obtained;
establishment of a first weighting dataset weighting edges more strongly from a subtraction dataset of the first intermediate dataset and the second intermediate dataset; and
establishment of a noise-reduced result dataset as a weighted sum of the first intermediate dataset and the second intermediate dataset, wherein the first intermediate dataset is weighted with the first weighting dataset, and the second intermediate dataset is weighted with one minus the first weighting dataset,
wherein a noise-reduced computed tomography dataset is established as the noise-reduced result dataset or from the noise-reduced result dataset.

12. The x-ray device of claim 11, wherein the x-ray device is a C-arm x-ray device.

13. In a non-transitory computer-readable storage medium that stores instructions executable by one or more processors for noise reduction in a three-dimensional computed tomography dataset, which is reconstructed from two-dimensional projection images recorded with an x-ray device using different recording geometries, the instructions comprising:
in a post-processing section following the reconstruction of the three-dimensional computed tomography dataset:
applying a first, edge-preserving filter to the reconstructed three-dimensional computed tomography dataset, such that a first intermediate dataset is obtained;
applying a second, morphological filter to the reconstructed three-dimensional computed tomography dataset, such that a second intermediate dataset is obtained;
establishing a first weighting dataset weighting edges more strongly from a subtraction dataset of the first intermediate dataset and the second intermediate dataset; and
establishing a noise-reduced result dataset as a weighted sum of the first intermediate dataset and the second intermediate dataset, wherein the first intermediate dataset is weighted with the first weighting dataset, and the second intermediate dataset is weighted with one minus the first weighting dataset,
wherein a noise-reduced computed tomography dataset is established as the noise-reduced result dataset or from the noise-reduced result dataset.

14. The non-transitory computer-readable storage medium of claim 13, wherein a guided filter or a bilateral filter is used as the first, edge-preserving filter, a bitonic filter is used as the second, morphological filter, or a combination thereof.

15. The non-transitory computer-readable storage medium of claim 14, wherein the first, edge-preserving filter, the second, morphological filter, or each of the first, edge-preserving filter and the second, morphological filter is applied two-dimensionally to consecutive slice images of the reconstructed computed tomography dataset in one image direction.

16. The non-transitory computer-readable storage medium of claim 15, wherein a one-dimensional filtering in the image direction is applied to the result dataset of the two-dimensional filtering.

17. The non-transitory computer-readable storage medium of claim 16, wherein for the one-dimensional filtering, a one-dimensional filter is applied to the result dataset, such that a third intermediate dataset is obtained, wherein the instructions further comprise:
establishing a second weighting dataset weighting edges more strongly from a subtraction dataset of the third intermediate dataset and the result dataset; and
establishing the noise-reduced computed tomography as a weighted sum of the result dataset and the third intermediate dataset,
wherein the result dataset is weighted with the second weighting dataset and the third intermediate dataset with one minus the second weighting dataset.

* * * * *